United States Patent Office 3,642,725
Patented Feb. 15, 1972

3,642,725
POLYMERS OF POLYFUNCTIONAL CYANAMIDES OF SECONDARY AMINES
Hans Dieter Schminke, Cologne-Mulheim, Ernst Grigat, Cologne-Stammheim, and Rolf Putter, Dusseldorf, Germany, assignors to Farbenfabriken Bayer Aktiengesellschaft, Leverkusen, Germany
No Drawing. Continuation-in-part of application Ser. No. 629,893, Apr. 11, 1967. This application Nov. 5, 1969, Ser. No. 874,417
Int. Cl. C08g 33/02
U.S. Cl. 260—78.4 N                  10 Claims

ABSTRACT OF THE DISCLOSURE

New polymers are formed by heating polyfunctional cyanamides of secondary amines together with catalytical quantities or up to more than molar quantities of mono- or polyvalent hydroxyl and/or thiol compounds to higher temperatures.

This application is a continuation-in-part of application Ser. No. 629,893, filed Apr. 11, 1967, and now abandoned.

The present invention relates to new polymers and a process of producing the new polymers by heating polyfunctional cyanamides of secondary amines together with catalytical quantities or up to more than molar quantities of mono- or polyvalent hydroxyl- and/or thiol compounds to temperatures of 50–250° C.

Heretofore it is known to produce polymers by reacting bis-cyanamides derived from primary aliphatic diamines at temperatures between room temperature and about 100° C., optionally in the presence of a basic catalyst (cf. British Pat. 1,009,892). Cyanamides of secondary amines do not react under the aforesaid reaction conditions.

It is therefore an object of this invention to provide a new method of producing new polymers with valuable physical and chemical properties. Another object of this invention is to provide new polymers with valuable physical and chemical properties. Another object of this invention is to provide new polymers which can be used to prepare moldings, foils, threads and coatings.

The foregoing objects and others which will become apparent from the following description are accomplished in accordance with this invention generally speaking by providing new polymers with valuable physical and chemical properties useful to prepare moldings, foils, threads and coatings. In other words the invention contemplates new polymers with valuable properties and a process of producing them. In accordance with the invention the new polymers are prepared by heating polyfunctional cyanamides of secondary amines together with catalytical quantities or up to more than molar quantities of mono- or polyvalent aromatic hydroxyl and/or thiol compounds to temperatures of 50 to 250°, preferably 100 to 200° C.

In accordance with another embodiment of the invention the reaction is accomplished with mixtures of different polycyanamides and mixtures of aromatic hydroxyl and thiol compounds. In accordance with another embodiment of the invention it is possible to carry out the reaction with the addition of mono-functional cyanamides.

The new polymers according to the invention may be prepared by heating a cyanamide or a mixture of different cyanamides together with a hydroxyl or a thiol component or with a mixture of different hydroxyl and/or thiol components, or the components are melted or heated separately and subsequently combined at elevated temperature. The reaction is conducted at temperatures between 50 and 250° C., preferably 100 to 200° C.

The size of the polymeric molecules can be reduced by addition of monofunctional cyanamides. These monofunctional cyanamides can be added in an amount up to 20% by weight, related to polyfunctional cyanamides. The hydroxyl or thiol components can be added in catalytical quantities (e.g. at least about 1% by weight) up to molar quantities, but also in larger than molar quantities. The upper limit for the addition of the hydroxyl or thiol components is about 2 mols, related to the polyfunctional cyanamides.

Examples of polyfunctional cyanamides of secondary amines include compounds according to the formula

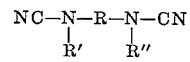

In this formula, R may represent an alkylene or an arylene radical as well as two and more radicals of this type, which may be linked by arylene or alkylene radicals or by hetero atoms. When using cyanamides of a higher valence than bivalence, the radical R may contain further radicals

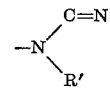

R′ and R″ may be alkyl or aralkyl radicals, and, jointly or together with —N—R—N—, may also form part of a heterocyclic system.

Examples of alkylene radicals R are straight-chain or branched, saturated or unsaturated, optionally cyclic aliphatic hydrocarbon radicals such as isohexylene, ethylene, isobutylene, propylene, butylene, pentylene, hexylene, decylene, octadecylene, cyclohexylene, cyclopentylene; as arylene radicals there may be mentioned by way of example the phenylene and naphthylene, the (poly)chlorophenylene, (poly)nitrophenylene, (poly)methylphenylene, (poly)chloronaphthylene, (poly)nitronaphthylene radical. An example of two alkylene radicals which are linked by an arylene radical, is the radical —CH₂—C₆H₄—CH₂; an example of two arylene radicals linked by an alkylene radical is the grouping C₆H₄—C(CH₃)₂—C₆H₄—. Arylene and alkylene radicals which are linked by hetero atoms include the diphenyloxide, diphenylsulfide or diphenylsulfone grouping as well as corresponding aliphatic groupings.

As alkyl radicals R′ and R″ there can be used for example straight-chain or branched, saturated or unsaturated, optionally cyclic aliphatic hydrocarbons having up to 20 carbon atoms.

Examples of aralkyl radicals R′ and R″ are the benzyl, phenylethyl, phenylpropyl radical. As a system wherein R′ and R″ together with —N—R—N form a heterocyclic ring system, there may be mentioned for example the piperazine ring. As polyvalent cyanamides there can be used e.g. the bis-cyanamides of the following diamines: N,N′-dimethylethylenediamine, N,N′-diethyl-, N,N′-di-n- or -isopropyl-, N,N′-di-n- or -iso- or -tert.-butyl-, N,N′- dihexyl-, N,N'-dicyclohexyl-, N,N'-di-dodecyl-, N,N'-di-octadecyl-, N,N'-dibenzyl-, N,N'-diallyl-, N,N'-dipropargylethylenediamine, as well as the correspondingly substituted propylenediamines, butylenediamines, butenylenediamines, butinylenediamines, hexamethylenediamines, decamethylenediamines, octadecamethylenediamines, phenylenediamines-(1,2) or -(1,3) or -(1,4), naphthylenediamines-(1,2) or -(1,3) or -(1,4) or -(1,5) or -(1,6) or -(1,7) or -(1,8) or -(2,3) or -(2,4) or -(2,6) or -(2,7, bis-methylaminobenzenes, 4,4'-bisaminobisphenylmethanes, 4,4' - bisaminobisphenylethanes-(1,1) and -(1,2), 4,4'-bisamino-bisphenylethylenes-(1,2), 4,4'-bisamino-bisphenylpropanes-(1,3) or -(2,2), 4,4'-bis-aminodiphenyloxides, 4,4'-bisamino - diphenyl-sulfides or -sulfones; furthermore, piperazine and N-methyl-β-aminoethylpiperazine.

Besides, there can be used e.g. the polycyanamides of N,N',N''-tris-N-alkyl - tris - amino - triphenylmethane, N,N',N''-tris-N-aralkyl - tris - amino - triphenylmethane, N,N',N''-tris-N-alkyl - tris - amino - triphenylphosphates and -thiophosphates and the N,N',N''-tris-N-aralkyl-tris-amino-triphenylphosphates and thiophosphates.

The polycyanamides which are suitable according to the invention further include cyanamides of polyimides, di- and poly-cyanamides of polyesters and polyethers, polyureas and polyurethanes containing —NH-alkyl groups. Suitable monofunctional cyanamides which can additionally be used in the reaction in minor quantities to control the molecular weight, are the cyanamides of any secondary amines. Examples of such monofunctional cyanamides are diethyl-cyanamide, dimethyl-cyanamide, dipropyl-cyanamide, dibutyl-cyanamide, dicyclohexyl-cyanamide, dichloroethyl - cyanamide, diallyl - cyanamide, methyl-stearyl-cyanamide, methyl - phenyl - cyanamide, morpholyl-cyanamide, piperidyl-cyanamide, di-(hydroxyethyl)-cyanamide.

Hydroxyl and thiol components which are particularly suitable in the herein described process include aromatic mono- and polyhydroxy compounds such as phenol, chlorophenol, bromophenol, fluorophenol, phenols carrying several halogen atoms, (o, m, p)-nitrophenols, alkylphenols, such as o-, m-, p-cresols, ethylenephenols, n- or isopropylphenols, n- or iso- or tert.-butylphenols, hexylphenols, dodecylphenols, alkoxyphenols, alkylmercaptophenols, cyanophenols, acylphenols, pyrocatechols, resorcinols, hydroquinones, phoroglucinols, pyrogallols, 2,4-dihydroxyacetophenones, 5-methyl-resorcinol, α- or β-naphthol and naphthols carrying substitutents listed with reference to the phenols, di- or polyhydroxynaphthalenes, dihydroxydiphenyl, dihydroxydiphenylether, dihydroxydiphenylsulfone, 4,4'-dihydroxydiphenylmethane, 4,4'-dihydroxydiphenylethane, 4,4' - dihydroxydiphenyl-propane-(2,2), and novolaks. As thiol compounds there may be mentioned; thiophenols, mono- or polyhalogeno thiophenols, nitrothiophenols, alkylthiophenols, cyanothiophenols, mercaptobenzothiazoles, mercaptobenzimidazoles, mercaptobenzoxazoles.

The new products obtained by the process as herein described are polymers characterized by a plurality of recurring polytriazine moieties. The aromatic hydroxyl or mercapto compound which has been used as catalyst is embedded in the polymers without chemical linkages.

The polytriazine structure of the polymers is shown by the fact that the product I obtained by heating of N-cyano morpholine with e.g. p-chlorophenol (molar ratio 4:1) at 175° C. and subsequent distilling off the p-chlorophenol in vacuo is identical with the product II obtained by reaction of 3 mols of morpholine with 1 mol of cyanuryl chloride:

|  | °C. |
|---|---|
| Melting point of product I | 285 |
| Melting point of product II | 285 |
| Melting point of mixture I and II | 285 |

The fact that the aromatic hydroxy and/or mercapto compounds do merely act as catalyst and do not enter into chemical reaction during the polymerisation process is demonstrated by following details:

The nature of the polymers is independent on the valence of the hydroxy resp. mercapto compound.

The polymerisation reaction can be carried out in the presence of catalytic amounts, e.g. 1% by weight only of hydroxy resp. mercapto compound.

The catalysts can be removed by pulverisation of the polymers and extraction with a suitable solvent such as acetone.

The products obtained by the herein described process are substantially hard, high-melting, insoluble high-molecular weight compounds which can be used to prepare a variety of articles with valuable physical and chemical properties, e.g. moldings, foils and threads, by the molding techniques customarily adopted in the plastics field. The polymers according to the invention can also be used to produce coatings on supports such as wood, glass, textiles, metal and pottery. Besides, they can be admixed during manufacture with fillers such as active charcoal, carbon black, wood powder, kieselguhr, pigments, glass fibers and metal powder.

The invention is further illustrated by the following examples without being restricted thereto.

EXAMPLE 1

A mixture of 10 g. of N,N'-dicyanopiperazine and 16.7 g. of 4,4'-dihydroxydiphenyldimethylmethane is heated to 175–180° C. The melt becomes viscous after 15 minutes and solidifies after another 10 minutes to yield a transparent, yellow-colored, very hard polymer.

The vitreous product is stable to temperatures up to above 300° C. and insoluble in all conventional solvents. Before solidification occurs the melt can be made into filaments. By pulverisation of 1 g. of the product and subsequent treatment with boiling acetone during 6 hours 550 mg. of 4,4'-dihydroxydiphenyl dimethylmethane (90%) can be extracted.

EXAMPLE 2

5 g. of N,N'-dicyanopiperazine and 6.7 g. of phenol are heated to 160° C. After 90 minutes the melt has solidified to a yellowish-brown-colored resin.

EXAMPLE 3

6.8 g. of N,N'-dicyanopiperazine and 7.5 g. of 4-tert.-butylphenol are heated to 175° C. The melt solidifies after 95 minutes to a hard-light-brown-colored, transparent polymer.

EXAMPLE 4

6.8 g. of N,N'-dicyanopiperazine and 6.4 g. of p-chlorophenol are heated to 175° C. After 23 minutes the melt solidifies to a transparent, brown-colored, hard polymer.

EXAMPLE 5

A mixture of 6.8 g. of N,N'-dicyanopiperazine and 12.4 g. of hydroquinonemonomethylether is heated to 180° C. After 50 minutes the melt solidifies to a hard, dark reddish-brown-colored product.

EXAMPLE 6

6.8 g. of N,N'-dicyanopiperazine and 2.75 g. of resorcinol are heated to 175–180° C. After 11 minutes the melt solidifies to a reddish-brown-colored hard polymer.

EXAMPLE 7

A mixture of 6.8 g. of N,N'-dicyanopiperazine and 2.3 g. of 1,5-dihydroxynaphthalene are heated to 175° C. After 30 minutes the melt solidifies to a black-colored polymer.

EXAMPLE 8

6.8 g. of N,N'-dicyanopiperazine and 1 g. of phloroglucinol are heated to 175° C. After 50 minutes the melt solidifies to a brown-colored resin.

EXAMPLE 9

6.8 g. of N,N'-dicyanopiperazine, 5.7 g. of 4,4'-dihydroxydiphenyldimethylmethane and 0.2 g. of phloroglucinol are heated to 180° C. After 23 minutes the melt solidifies to a light-brown-colored, transparent, very hard polymer.

EXAMPLE 10

A mixture of 6.8 g. of N,N'-dicyanopiperazine, 10.8 g. of 4,4'-dihydroxydiphenyldimethylmethane and 0.6 g. of 4,4'-dihydroxydiphenylsulfone solidifies at 175° C. in the course of 11 minutes to a yellow-colored, transparent, hard polymer.

EXAMPLE 11

6.8 g. of N,N'-dicyanopiperazine and 10.6 g. of a novolak having a molecular weight of 1000 are heated to 175° C. After 11 minutes the melt solidifies to a reddish-brown-colored, very hard product.

EXAMPLE 12

A mixture of 5 g. of N,N'-dicyanopiperazine, 8.4 g. of 4,4'-dihydroxydiphenyldimethylmethane and 6.7 g. of kieselguhr is heated to 180° C. After 22 minutes the melt solidifies to a very hard product.

EXAMPLE 13

5 g. of N,N'-dicyanopiperazine, 8.4 g. of 4,4'-dihydroxydiphenyldimethylmethane and 2.7 g. of active charcoal are mixed and heated to 175° C. After 18 minutes the melt solidifies to a hard polymer. Polymerization proceeds in equal manner if bleaching earth, cellulose powder or glass wool is used as a filler.

EXAMPLE 14

6.8 g. of N,N'-dicyanopiperazine, 0.6 g. of N-cyanomorpholine and 12 g. of 4,4'-dihydroxydiphenyldimethylmethane are heated to 180° C. After 17 minutes a transparent, hard polymer is obtained.

EXAMPLE 15

6.1 g. of N,N'-dicyanopiperazine, 1.3 g. of di-β-hydroxyethylcyanamide and 11.4 g. of 4,4'-dihydroxydiphenyldimethylmethane are heated to 175° C. After 16 minutes the clear melt has become hard.

EXAMPLE 16

7.6 g. of N,N'-dicyano-4,4'-di-(N-methyl-amino)-3,3'-dimethyl-diphenylmethane and 5.7 g. of 4,4'-dihydroxydiphenyldimethylmethane are heated to 175° C. After 110 minutes the melt solidifies to a brown-colored, transparent polymer.

EXAMPLE 17

7.6 g. of N,N'-dicyano-4,4'-di-(N-methylamino)-3,3'-dimethyldiphenylmethane, 3.4 g. of N,N'-dicyanopiperazine and 11.4 g. of 4,4' - dihydroxydiphenyldimethylmethane are heated to 175° C. After 60 minutes the melt solidifies to a transparent, yellowish-brown-colored, very hard polymer.

EXAMPLE 18

1.7 g. of N,N'-dicyano-N,N'-dimethylethylenediamine, 5.1 g. of N,N'-dicyanopiperazine and 11.4 g. of 4,4'-dihydroxy-diphenyldimethylmethane are heated to 180° C. After 14 minutes a yellow-colored, transparent, solid product is obtained which is somewhat elastic at 180° C. and hard at room temperature.

EXAMPLE 19

A mixture of 6.8 g. of N,N'-dicyanopiperazine and 7.2 g. of p-chloro-thiophenol is melted at 175° C. After 70 minutes the melt solidifies to a dark-brown-colored product.

EXAMPLE 20

6.8 g. of N,N'-dicyanopiperazine and 8.4 g. of 2-mercaptobenzothiazol are heated to 175° C. After 1 hour the melt solidifies to a black-colored hard polymer.

EXAMPLE 21

A mixture of 6.8 g. of N,N'-dicyanopiperazine, 5.7 g. of 4,4'-dihydroxydiphenyldimethylmethane and 4.15 g. of 4-tert.-butyl-thiophenol is heated to 180° C. After 13 minutes the melt solidifies to a reddish-brown-colored polymer which is very hard at room temperature and somewhat elastic at 180° C.

EXAMPLE 22

20 g. N,N'-dicyanopiperazine, 10 g. of bleeching earth and 0.2 g. of phloroglucinol are heated to 180° C. After 125 minutes the melt solidifies to a transparent brown colored hard polymer.

EXAMPLE 23

6.8 g. of N,N'-dicyanopiperazine, 7.5 g. of 4-tert.-butylphenol and 6.4 g. of p-chlorophenol are heated to 180° C. After 35 minutes the melt solidifies to a transparent brown colored hard polymer.

It is to be understood that the foregoing examples are given for the purpose of illustration and that any other suitable polyfunctional cyanamide or mono- or polyvalent hydroxyl and/or thiol compound can be used providing that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polymeric product characterized by a plurality of recurring polytriazine moieties and produced by the process of homopolymerizing a polyfunctional cyanamide of a secondary amine of the formula

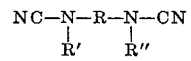

wherein R is a bivalent radical selected from the group consisting of alkylene and arylene and two radicals of this type linked by an arylene radical, an alkylene radical, an oxygen atom or a sulfur atom which radical may be substituted with

and R' and R" are alkyl or aralkyl and jointly or together with —N—R—N— may form a heterocyclic moiety, by heating said polyfunctional compound to a temperature of from 50 to 250° C. and in the presence of from about 1% by weight to up to twice the molar quantity of a catalyst, based on the quantity of said polyfunctional compound, which is a phenol or thiophenol.

2. The polymeric product of claim 1 produced by copolymerizing a mixture of said polyfunctional cyanamides of secondary amines of said formula.

3. The polymerizing product of claim 1 produced by the process of homopolymerizing a difunctional cyanamide of a secondary amine of said formula.

4. The polymeric product of claim 1 obtained by the process of copolymerizing a polyfunctional cyanamide of a secondary amine of said formula with up to 20% by weight, based on said polyfunctional cyanamide, of a monofunctional cyanamide of a secondary monoamine.

5. The polymeric product of claim 1 wherein said polyfunctional cyanamide of a secondary amine of said formula is selected from the group consisting of N,N'-dicyanopiperazine and N,N'-dicyano - 4,4' - di-(N-methyl-amino)-3,3'-dimethyl-diphenylmethane.

6. The polymeric product of claim 1 wherein said catalyst is a phenol.

7. The polymeric product of claim 1 wherein said catalyst is a thiophenol.

8. The polymeric product of claim 1 wherein said catalyst is a phenol having one hydroxy group.

9. The polymeric product of claim 1 wherein said catalyst is a thiophenol having one mercapto group.

10. The polymeric product of claim 1 wherein said catalyst is selected from the group consisting of 4,4'-dihydroxydiphenyldimethylmethane, phenol, 4 - tert.-butylphenol, p - chlorophenol, hydroquinonemonomethylether, resorcinol, 1,5-dihydroxynaphthalene, phloroglucinol, p-chloro-thiophenol, 2 - mercaptobenzothiazol and 4-tert.-butyl-thiophenol.

References Cited

UNITED STATES PATENTS

| 2,628,216 | 2/1953 | Magat | 260—78 |
| 2,628,218 | 2/1953 | Magat | 260—78 |
| 3,131,167 | 4/1964 | Cotter | 260—77.5 |

WILLIAM H. SHORT, Primary Examiner

L. L. LEE, Assistant Examiner

U.S. Cl. X.R.

117—124 E, 132 B, 148; 260—32.8 N, 37 M, 37 N, 47 CZ, 47 CP